UNITED STATES PATENT OFFICE.

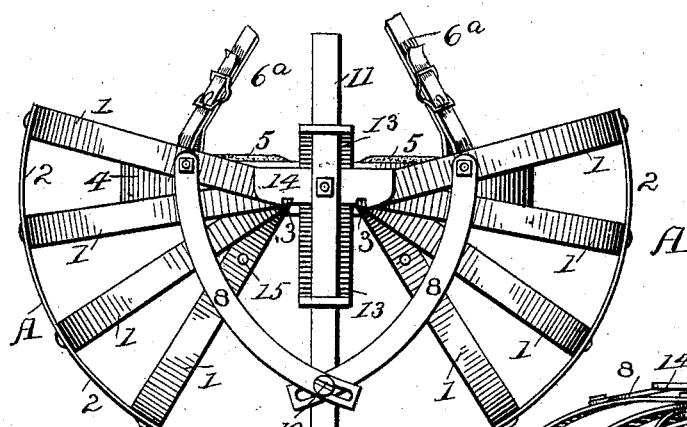
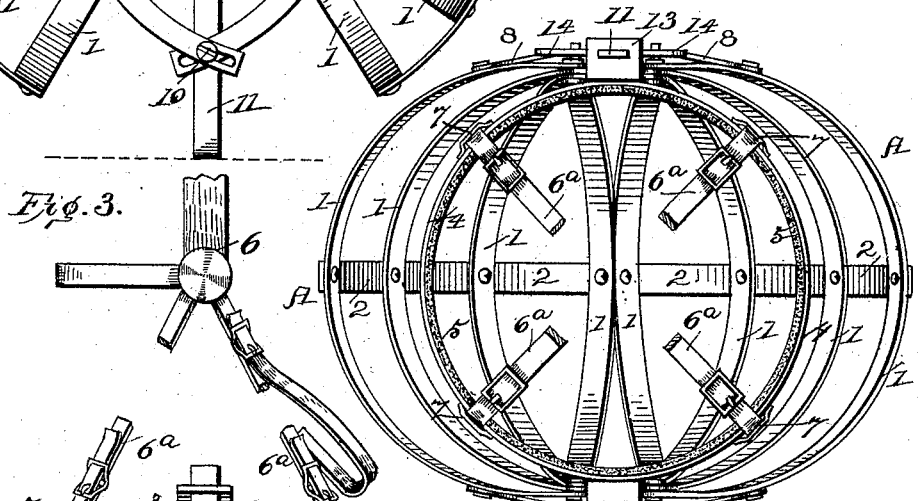
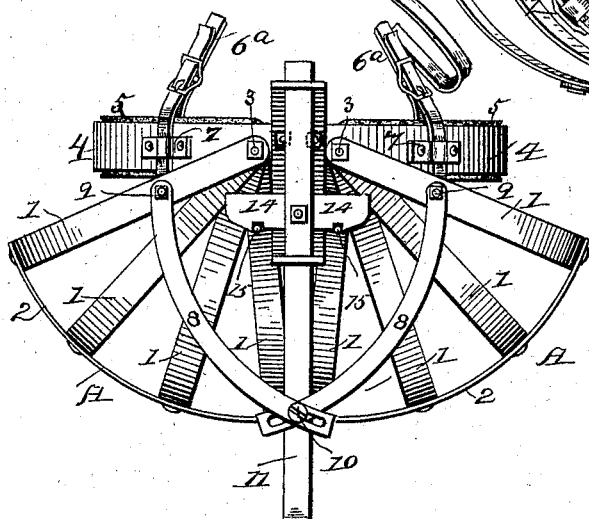

FRANCIS MARION ROWLAND, OF WEBBERS FALLS, INDIAN TERRITORY.

MUZZLE.

No. 806,004.　　　Specification of Letters Patent.　　　Patented Nov. 28, 1905.

Application filed July 26, 1905. Serial No. 271,321.

*To all whom it may concern:*

Be it known that I, FRANCIS MARION ROWLAND, a citizen of the United States, and a resident of Webbers Falls, in district No. 10, Indian Territory, have made certain new and useful Improvements in Muzzles, of which the following is a specification.

My invention is an improvement in muzzles for horses and horned cattle, and particularly in that class of muzzles which are composed of hinged sections that remain normally closed, but are caused to open automatically when the animal lowers his head, so as to cause certain portions of the muzzle to strike or press upon the ground, with the result that the animal may then graze without restraint.

I have devised an improved construction, arrangement, and combination of parts whereby I produce a durable, reliable, and automatically-operating muzzle.

The details of the invention are as hereinafter described and illustrated in the accompanying drawings, in which—

Figure 1 is a side view of the muzzle with the hinged sections in the open position. Fig. 2 is a plan view of the muzzle with the hinged sections in the closed position. Fig. 3 is a side view of the muzzle with the hinged sections closed. Fig. 4 is a perspective view of portions of the muzzle.

The hinged sections or jaws A of the muzzle are composed of a series of semicircular sheet-metal bands 1, which radiate from common points and are connected at their divergent ends by means of sheet-metal bands or straps 2. The pivotal centers of the sections are at 3, they being attached to a narrow sheet-metal band 4, which is circular in form and adapted to receive the nose of the animal. The headstall 6 has divergent side or cheek straps 6ª, which are detachably connected with the nose-band 4 at points located nearly equidistantly, as indicated in Fig. 2, and keepers 7 are attached to the nose-band 4 for holding the loops of the straps 6ª in due position. The said nose-band is provided with a pad or cushion 5, the same being circular and extending entirely around the inner side of the band and being made somewhat wider than the latter. It is supported in place by the loops of the headstall through which it passes. The sections A hang normally in closed position by gravity, as indicated in Figs. 2 and 3, and when they are in this position it is obvious the animal cannot graze. The sections are opened automatically—that is to say, thrown outward and upward, as indicated in Fig. 1, so that the animal may graze without restraint—by means of the following devices: Curved bars 8 are pivoted at 9 to the uppermost bands 1, and their lower slotted ends are connected by a screw 10 with vertical bars 11, which are adapted to slide in guides formed by the horizontal flanges 12 of a bracket 13. The latter is attached by a screw-bolt or riveted to the metal band 4. As shown in Fig. 2, the brackets 13 are arranged diametrically opposite. Since the bars 11 are adapted to slide freely in the guides referred to and since they project a considerable distance below the hinged sections A, it is apparent that when the animal lowers his head so that the lower ends of the bars 11 are pressed upon the ground the effect will be to open the sections, as in Fig. 1, since the bars 11 will then slide upward, and thus raise the sections A through the medium of the curved bars 8, and contrariwise when the animal raises his head so that the bars 11 no longer press upon the ground the bars will slide downward and the sections resume their normal closed position, as in Fig. 3. The slots provided in the lower ends of the curved bars 8 permit a certain degree of adjustment which may be required. I apply a double catch 14 to each of the bars 11 and secure the same at a point intermediate of the flanges 12 of brackets 13. The catches 14 are bars or plates projecting laterally from the bars 11 and having notches in their under sides, which when the sections are closed engage studs 15, that project from the lower semicircular bands 1. By this means the sections are practically locked when in the closed position, Fig. 3, but will be opened by pressure upon the lower ends of the bars 11. It will thus be understood that when the animal raises his head or in any case when the push-bars 11 are out of contact with the ground the jaws, push-bars, and catches resume their normal position or engagement, as shown in Fig. 3.

It is apparent that the muzzle will prevent an animal from eating growing crops or injuring trees, &c., when being driven through a field, and yet the animal is permitted to graze without difficulty upon lowering its head to the ground. It will be understood that either of the push-bars 11 may be pressed against the ground or any other object without opening the muzzle, since each of the bars is provided with a lock or catch which operates independently of the other. In brief, pressure must be applied to both push-bars simultaneously in order to open the muzzle. It will be perceived that this feature particularly adapts the muzzle for use as a weaner for young stock and for use in preventing stock from eating growing crops while passing through them, since in such case the muzzle will only open when the animal lowers its head to the ground.

The muzzle will be made of different sizes to adapt it for different animals and may be applied to calves and colts to aid in weaning them.

Having thus described my invention, what I claim as new, and desire to secure by Letters Patent, is—

1. The improved muzzle comprising a nose-band, sections hinged thereto at opposite points and comprising a series of semicircular bands whose divergent ends are rigidly connected, guide-brackets attached to the nose-band at opposite points and between the pivots of the hinged sections, push-bars arranged slidably in said brackets, and side bars pivoted to the sections and also to push-bars, and a locking device comprising catches, attached to the push-bars, and studs projecting from the sections and engaging the catches when the muzzle is closed, substantially as described.

2. The improved muzzle comprising a nose-band, skeleton sections comprising a series of semicircular bands which are pivoted to the nose-band at common points and rigidly connected so that their outer ends are held divergent, push-bars arranged vertically on opposite sides of the nose-band, and guides therefor in which said bars are adapted to slide vertically, and means for connecting said push-bars with the sections whereby, when the lower ends of the push-bars strike upon the ground, the sections are open so that the animal may graze without restraint, substantially as described.

3. The improved muzzle comprising a nose-band, hinged sections which are pivoted to the nose-band at opposite points and adapted when closed to cover the nose of the animal, push-bars arranged on opposite sides of the nose-band and adapted to slide vertically in suitable guides, means for connecting such push-bars with the hinged sections, and means for automatically locking and unlocking the sections as the push-bars slide downward and upward respectively, substantially as described.

4. In a muzzle of the character described, the combination, with a nose-band and hinged sections adapted to close together by gravity and thus cover the nose of the animal, of guides arranged at opposite points and suitably attached to the nose-band, push-bars adapted to slide in such guides and projecting below the sections, side bars pivotally attached to the sections and having their lower ends slotted, screws passing through the slots and thus connecting the push-bars and side bars adjustably, substantially as described.

FRANCIS MARION ROWLAND.

Witnesses:
ROBERT WILKERSON,
W. L. ABBOTT.